(12) United States Patent
Giri et al.

(10) Patent No.: US 10,580,427 B2
(45) Date of Patent: Mar. 3, 2020

(54) EAR-WORN ELECTRONIC DEVICE INCORPORATING ANNOYANCE MODEL DRIVEN SELECTIVE ACTIVE NOISE CONTROL

(71) Applicant: Starkey Laboratories, Inc., Eden Prairie, MN (US)

(72) Inventors: Ritwik Giri, Eden Prairie, MN (US); Karim Helwani, Eden Prairie, MN (US); Tao Zhang, Eden Prairie, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 16/173,767

(22) Filed: Oct. 29, 2018

(65) Prior Publication Data

US 2019/0130926 A1  May 2, 2019

Related U.S. Application Data

(60) Provisional application No. 62/578,972, filed on Oct. 30, 2017.

(51) Int. Cl.
*H03G 3/24* (2006.01)
*G10L 21/0216* (2013.01)
(Continued)

(52) U.S. Cl.
CPC .......... *G10L 21/0216* (2013.01); *G10L 17/02* (2013.01); *G10L 21/0208* (2013.01);
(Continued)

(58) Field of Classification Search
CPC ..... G10L 21/0216; G10L 17/02; H04R 3/002; H04R 5/04
(Continued)

(56) References Cited

U.S. PATENT DOCUMENTS 10,224,890 B1 * 3/2019 Fraley ...................... H03G 3/24
2004/0234089 A1 * 11/2004 Rembrand ............. H04R 25/30
381/312
(Continued)

FOREIGN PATENT DOCUMENTS

WO  2005051039  6/2005
WO  2008083315  7/2008
WO  2014138349  9/2014

OTHER PUBLICATIONS

Fedorov et al., "A Unified Framework for Sparse Non-Negative Least Squares using Multiplicative Updates and the Non-Negative Matrix Factorization Problem", Jan. 2, 2018, 31 pages.
(Continued)

*Primary Examiner* — Vivian C Chin
*Assistant Examiner* — Ubachukwu A Odunukwe
(74) *Attorney, Agent, or Firm* — Mueting, Raasch & Gebhardt, P.A.

(57) ABSTRACT

A system comprises an ear-worn electronic device configured to be worn by a wearer. The ear-worn electronic device comprises a processor and memory coupled to the processor. The memory is configured to store an annoying sound dictionary representative of a plurality of annoying sounds pre-identified by the wearer. A microphone is coupled to the processor and configured to monitor an acoustic environment of the wearer. A speaker or a receiver is coupled to the processor. The processor is configured to identify different background noises present in the acoustic environment, determine which of the background noises correspond to one or more of the plurality of annoying sounds, and attenuate the one or more annoying sounds in an output signal provided to the speaker or receiver.

22 Claims, 6 Drawing Sheets

(51) Int. Cl.
  *H04R 3/00*     (2006.01)
  *G10L 17/02*    (2013.01)
  *H04R 5/04*     (2006.01)
  *H04R 25/00*    (2006.01)
  *G10L 21/0208*  (2013.01)
  *H04R 1/10*     (2006.01)
  *H04R 5/033*    (2006.01)

(52) U.S. Cl.
  CPC ........... *H04R 1/1083* (2013.01); *H04R 3/002* (2013.01); *H04R 5/04* (2013.01); *H04R 25/505* (2013.01); *G10L 2021/02087* (2013.01); *G10L 2021/02163* (2013.01); *H04R 5/033* (2013.01); *H04R 2460/01* (2013.01)

(58) Field of Classification Search
  USPC .................................. 381/71.1, 74, 103, 312
  See application file for complete search history.

(56) References Cited

U.S. PATENT DOCUMENTS

| | | | |
|---|---|---|---|
| 2013/0035933 A1* | 2/2013 | Hirohata | G10L 15/20 704/206 |
| 2013/0039498 A1 | 2/2013 | Adachi et al. | |
| 2014/0185828 A1* | 7/2014 | Helbling | H03G 5/165 381/103 |
| 2015/0294662 A1 | 10/2015 | Ibrahim | |
| 2017/0103745 A1 | 4/2017 | Baker et al. | |

OTHER PUBLICATIONS

Fevotte et al., "BSS_EVAL Toolbox User Guide—Revision 2.0. [Technical Report]", 2005, 22 pages.
Heittola et al., "Sound Event Detection in Multisource Environments Using Source Separation", CHiME 2011 Workshop on Machine Listening in Multisource Environments, Sep. 1, 2011, 5 pages.
Heller et al., "A General Formulation of Modulated Filter Banks", IEEE Transactions on Signal Processing, vol. 47, No. 4, Apr. 1999, pp. 986-1002.
Lefevre et al., "Itakura-Saito nonnegative matrix factorization with group sparsity", May 22, 2011, 20 pages.
Le Roux et al., "Spars NMF—half-baked or well done?", Mitsubishi Electric Research Laboratories, Mar. 2015, 23 pages.
Lollmann et al., "Low Delay Filter-Banks for Speech and Audio Processing", Speech and Audio Processing in Adverse Environments, 2008, pp. 13-61.
Milani et al., "A New Delayless Subband Adaptive Filtering Algorithm for Active Noise Control Systems", IEEE Transactions on Audio, Speech, and Language Processing, vol. 17, No. 5, Jul. 2009, pp. 1038-1045.
Ranjan et al., "Selective Active Noise Control System for Open Windows using Sound Classification", Inter-Noise 2016, 11 pages.
Schuller et al., "Modulated Filter Banks with Arbitrary System Delay: Efficient Implementations and the Time-Varying Case", IEEE Transactions on Signal Processing, vol. 48, No. 3, Mar. 2000, pp. 737-748.
Vetterli, "A Theory of Multirate Filter Banks", IEEE Transactions on Acoustics, Speech, and Signal Processing, ASSP-35, No. 3, Mar. 1987, pp. 356-372.
Wu et al., "Subban Kalman Filtering for Speech Enhancement", IEEE Transactions on Circuit and Systems—II: Analog and Digital Signal Processing, vol. 45, No. 8, Aug. 1998, pp. 1072-1083.
International Search Report and Written Opinion dated Jan. 29, 2019 from PCT Application No. PCT/US2018/058129, 11 pages.
Enzner et al., "A Frequency-domain Adaptive Kalman Filter for Acoustic Echo Control in Hands-free Telephones", Signal Processing, vol. 86, No. 6, Jun. 2006, pp. 1140-1156.
Giri et al., "Type I and Type II Bayesian Methods for Sparse Signal Recovery Using Scale Mixtures", IEEE Transactions on Signal Processing, vol. 64, 2016, pp. 3418-3428.
Kuo et al., "Active noise control: a tutorial review", Proceedings of the IEEE, vol. 87, No. 6, Jun. 1999, pp. 943-973.
Morgan et al., "A delayless subband adaptive filter architecture", IEEE Transactions on Signal Processing, vol. 43, No. 8, Aug. 1995, pp. 1819-1830.
Nayebi et al., "Low delay FIR filter banks: Design and evaluation", IEEE Transactions on Signal Processing, vol. 42, No. 1, 1994, pp. 24-31.

* cited by examiner

US 10,580,427 B2

EAR-WORN ELECTRONIC DEVICE INCORPORATING ANNOYANCE MODEL DRIVEN SELECTIVE ACTIVE NOISE CONTROL

RELATED PATENT DOCUMENTS

This application claims the benefit of Provisional Patent Application Ser. No. 62/578,972 filed on Oct. 30, 2017, to which priority is claimed pursuant to 35 U.S.C. § 119(e), and which is incorporated herein by reference in its entirety.

TECHNICAL FIELD

This application relates generally to ear-worn electronic devices, including hearing devices, hearing aids, personal amplification devices, and other hearables.

BACKGROUND

Hearing devices provide amplified sound for the wearer. Some examples of hearing devices are headsets, hearing aids, in-ear monitors, cochlear implants, bone conduction devices, and personal listening devices. For example, hearing aids provide amplification to compensate for hearing loss by transmitting amplified sounds to the ear drum. Although hearing devices provide amplified sound for the wearer, some amplified sounds may be considered annoying by the wearer, degrading the listening experience of the wearer.

SUMMARY

Embodiments of the disclosure are directed to a method implemented by an ear-worn electronic device configured to be worn by a wearer. The method comprises storing, in a memory of the device, an annoying sound dictionary representative of a plurality of annoying sounds pre-identified by the wearer. The method comprises monitoring, by the device, an acoustic environment of the wearer. The method also comprises identifying, by a processor of the device, different background noises present in the acoustic environment. The method further comprises determining, by the processor, which of the background noises corresponds to one or more of the plurality of annoying sounds pre-identified by the wearer. The method also comprises attenuating, by the processor, the one or more annoying sounds in an output signal provided to a speaker or a receiver of the device.

Embodiments are directed to a system comprising an ear-worn electronic device configured to be worn by a wearer. The ear-worn electronic device comprises a processor and memory coupled to the processor. The memory is configured to store an annoying sound dictionary representative of a plurality of annoying sounds pre-identified by the wearer. A microphone is coupled to the processor and configured to monitor an acoustic environment of the wearer. A speaker or a receiver is coupled to the processor. The processor is configured to identify different background noises present in the acoustic environment, determine which of the background noises correspond to one or more of the plurality of annoying sounds, and attenuate the one or more annoying sounds in an output signal provided to the speaker or receiver.

The above summary is not intended to describe each disclosed embodiment or every implementation of the present disclosure. The figures and the detailed description below more particularly exemplify illustrative embodiments.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
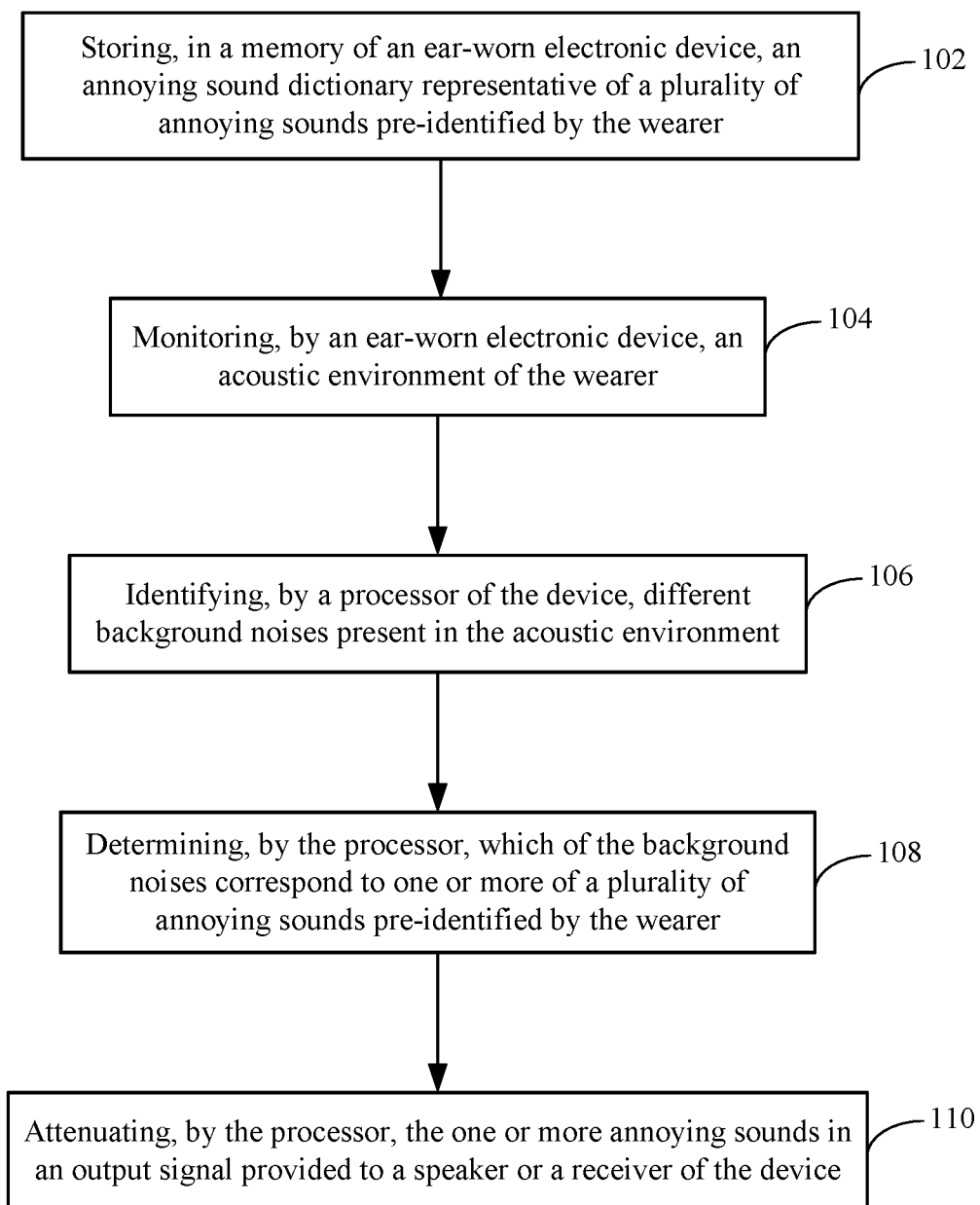
FIG. 1 illustrates a method implemented by an ear-worn electronic device incorporating an annoyance model driven selective active noise control (ANC) system in accordance with various embodiments.

It is understood that the embodiments described herein may be used with any ear-worn electronic device without departing from the scope of this disclosure. The devices depicted in the figures are intended to demonstrate the subject matter, but not in a limited, exhaustive, or exclusive sense. It is also understood that the present subject matter can be used with a device designed for use in or on the right ear or the left ear or both ears of the wearer.

The term ear-worn electronic device of the present disclosure refers to a wide variety of ear-level electronic devices that can aid a person with impaired hearing. The term ear-worn electronic device also refers to a wide variety of ear-level electronic devices that can produce enhanced, optimized or processed sound for persons with normal hearing. Ear-worn electronic devices of the present disclosure include hearables (e.g., wearable earphones, headphones, in-ear monitors, earbuds, virtual reality headsets), hearing aids (e.g., hearing instruments), cochlear implants, and bone-conduction devices, for example. Ear-worn electronic devices include, but are not limited to, behind-the-ear (BTE), in-the-ear (ITE), in-the-canal (ITC), invisible-in-canal (IIC), receiver-in-canal (RIC), receiver-in-the-ear (RITE) or completely-in-the-canal (CIC) type hearing devices or some combination of the above. Throughout this disclosure, reference is made to an "ear-worn electronic device," which is understood to refer to a system comprising a left ear device, a right ear device, or a combination of a left ear device and a right ear device.

Embodiments of the disclosure are directed to an ear-worn electronic device which incorporates an active noise control system configured to attenuate (e.g., cancel) annoying sounds present in the surrounding acoustic environment. Embodiments are directed to an ear-worn electronic device which incorporates an annoyance model driven ANC system configured to selectively attenuate (e.g., cancel) one or more of a plurality of annoying sounds pre-identified by the wearer. According to various embodiments, a psychoacoustic annoyance model is implemented to drive an ANC system of an ear-worn electronic device based on user preferences.

Traditional ANC systems aim at annihilating the noise signal at an error measurement microphone by emitting a destructive interferer, obtained as a filtered version of the reference microphone signal. Traditional ANC systems are often implemented in conjunction with passive noise systems to further improve the noise isolation. A major challenge in designing and implementing ANC systems is the delay requirement. In contrast to a telecommunication scenario employing microphone array or speech enhancement algorithms where the delay requirements are mainly determined by communication quality considerations, the processing delay requirements in an ANC setup are much more strict. To enable active cancellation, the processing delay of the system needs to be smaller than the time required for the sound to travel from a point coinciding with the reference microphone to the error microphone. Typically, traditional ANC systems do not distinguish different noise types and attempt to cancel as much as possible of the noise signal. But often, it is desired to allow the user to stay in awareness of his or her environment and selectively cancel disturbing and annoying noises.

Embodiments of an annoyance model driven selective ANC system disclosed herein are operative during an offline training stage and during an online testing/actual-use stage. According to some embodiments, in an offline training stage, the ANC system identifies or fingerprints different noise types and computes an annoyance score (e.g., a psychoacoustical annoyance score) for each noise type. During this stage, the wearer's perception of the different noise types can be evaluated to determine which noises are considered by the wearer to be annoying and to what degree. Fingerprints of the noise types deemed annoying by the wearer are generated, and an annoyance score established by the wearer is assigned to each annoying sound.

During online processing, background noises that are present in the wearer's acoustic environment are identified by the ANC system based on the noise fingerprints learned during the offline training stage. According to some embodiments, the ANC system implements a Block Sparse Non-negative Matrix Factorization (B-NMF) process to identify the background noises that are present in the wearer's acoustic environment, and assigns a soft membership score to each of the identified noises. These membership scores are then used along with the annoyance score to inform a Kalman filter based noise canceler of the ANC system to cancel the annoying sounds, but pass through all other sounds. It has been found that an annoyance model driven selective ANC system of the present disclosure delivers a pleasant yet acoustically aware listening experience to the wearer.

FIG. 1 illustrates a method implemented by an ear-worn electronic device incorporating an annoyance model driven selective ANC system in accordance with various embodiments. The method shown in FIG. 1 involves storing 102, in a memory of an ear-worn electronic device, an annoying sound dictionary representative of a plurality of annoying sounds pre-identified by the wearer of the device. The method involves monitoring 104, by the ear-worn electronic device, an acoustic environment of the wearer. The method involves identifying 106, by a processor of the ear-worn electronic device, different background noises present in the acoustic environment. The method also involves determining 108, by the processor, which of the background noises correspond to one or more of a plurality of annoying sounds pre-identified by the wearer. The method further involves attenuating (e.g., canceling) 110, by the processor, the one or more annoying sounds in an output signal provided to a speaker or a receiver of the ear-worn electronic device.

Figure 2:
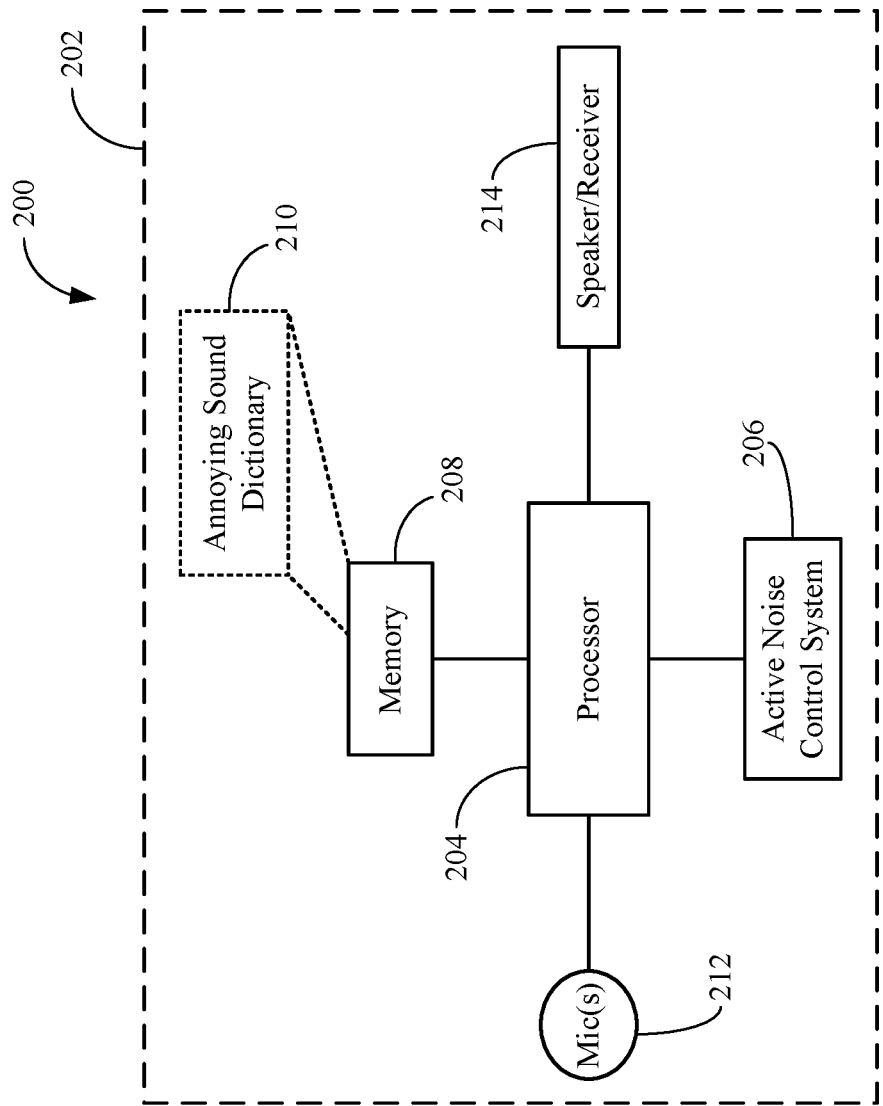
FIG. 2 illustrates an ear-worn electronic device incorporating an annoyance model driven selective ANC system in accordance with various embodiments.

FIG. 2 illustrates an ear-worn electronic device incorporating an annoyance model driven selective ANC system in accordance with various embodiments. The ear-worn electronic device 200 shown in FIG. 2 represents an ear-level device. The ear-worn electronic device 200 includes a housing 202 configured to be worn at, on, or in an ear of a wearer. The housing 202 can be configured as an enclosure or shell for any of the ear-worn electronic devices disclosed herein. For example, in some configurations, the housing 202 can be configured to be at least partially inserted into an ear canal of the wearer (e.g., an earbud, a BTE, RIC, or ITE device). In other configurations, the housing 202 can be configured to be fully inserted into the ear canal of the wearer (e.g., an ITC, CIC or IIC device). In further configurations, the housing 202 can be configured to contact the pinna of the ear with no portion extending into the ear canal of the wearer (e.g., earphones, headphones).

Included within the housing 202 are a number of components, including a processor 204 and a memory 208. The processor 204 incorporates or is coupled to an active noise control system 206. In some embodiments, the active noise control system 206 can incorporate the architecture shown in FIG. 5. The processor 204 is also coupled to one or more microphones 212 and a speaker or a receiver 214. The memory 208 is configured to store a plurality of annoying sounds pre-identified by the wearer of the ear-worn electronic device 200. For example, the memory 208 can be configured to store one or more dictionaries 210 representative of a plurality of annoying sounds pre-identified by the wearer. The one or more dictionaries 210 can be representative of a plurality of annoying sounds pre-identified by the wearer which are stored in the memory 208 in the form of noise fingerprints.

The microphone 212 is configured to monitor an acoustic environment of the wearer. According to various embodiments, the processor 204 is configured to identify different background noises present in the acoustic environment, and determine which of the background noises correspond to one or more of the annoying sounds stored (e.g., as noise fingerprints) in the memory 208. The processor 204 is configured to attenuate (e.g., cancel) the one or more annoying sounds and an output signal provided to the speaker or receiver 214.

The processor 204 can be configured to determine that a multiplicity of the background noises correspond to a multiplicity of the annoying sounds present in the acoustic environment. The processor 204 can be configured to attenuate the multiplicity of annoying sounds in the output signal supplied to the speaker or receiver 214. The processor 204 can be configured to attenuate only the one or more annoying sounds identified in the acoustic environment while passing all other sounds present in the acoustic environment.

In some embodiments, the processor 204 is configured to attenuate each of the annoying sounds identified in the output signal supplied to the speaker or receiver 214 by a degree of attenuation pre-identified by the wearer. Because annoyance of a particular sound is highly subjective, one person may percieve a particular sound to be more or less annoying than another person. For example, the sound of running water from a faucet can be highly annoying to a hearing aid wearer, while this sound may be comfortable to a person with normal hearing. The degree of attenunation of the annoying sounds represented in the one or more dictionaries 210 can be adjusted to suit a particular wearer. In some cases, selecting sounds deemed annoying by the wearer and setting the degree of attenunation of the annoying sounds can be performed using fitting software running on a PC or other computing device. In other cases, setting the degree of attenunation of the annoying sounds can be performed by the wearer faciliated by an app (e.g., fitting software) running on a smartphone, tablet or laptop communicatively linked to the ear-worn electronic device 200.

Also, one or more annoying sounds represented in the one or more dictionaries 210 can be canceled. For example, a particular sound of an initial set of sounds considered by a population to be annoying can be stored in the one or more dictionaries 210. However, some of these sounds may not be annoying to a particular wearer. As such, the particular wearer may cancel (delete) the particular annoying sound represented in the one or more dictionaries 210.

In some embodiments, the processor 204 uses an audiogram of the wearer to attenuate annoying sounds in the output signal supplied to the speaker or receiver 214. An audiogram indicates how much a person's hearing varies from normal, and quantifies the person's hearing loss. An audiogram can be used by the processor 204 to amplify ambient sound and attenuate annoying sounds in a way that compensates for the wearer's frequency specific hearing loss. In one approach, a wearer's audiogram can be generated by an audiologist who performs a hearing test on a particular wearer. The wearer is asked to listen to tones over a range of frequencies and amplitudes. This test produces an audiogram, a plot of the wearer's hearing loss as a function of frequency. This audiogram can be available directly on the ear-worn electronic device or transmitted from an electronic device (e.g., PC, laptop) running fitting software to the ear-worn electronic device 200 via a wireless link. In another approach, the wearer's audiogram can be generated by a fitting app executed by a smartphone. For example, the smartphone app can play a series of tones at different frequencies with the amplitude controlled by a slider bar on the smartphone's touch screen. For each tone, the wearer slides the bar up to the point where the tone is just barely audible. This procedure determines the wearer's hearing loss as a function of frequency and generates the wearer's audiogram. This audiogram can be transmitted from the smartphone to the ear-worn electronic device via a wireless link.

In some embodiments, a new annoying sound identified by the wearer can be added to the annoying sound dictionary 210 by the wearer. For example, the wearer of an ear-worn electronic device 200 may be walking down a city street where a jackhammer is operating. The wearer may consider the sound of the jackhammer to constitute an annoying sound. The wearer can initiate an "add new annoying sound" function via a switch of the device 200 or a smartphone running an ANC app communicatively coupled to the device 200. The new annoying sound captured by the ear-worn electronic device 200 (or the smartphone) is communicated to the smartphone which, in turn, communicates the new annoying sound to an ANC server via the cloud. A fingerprint of the new annoying sound is generated by the ANC server, such as in a manner described hereinbelow. In addition to the fingerprint, an annoyance score is assigned to the new annoying sound by the ANC server, such as in a manner described hereinbelow. This annoyance score can be adjusted by the wearer as previously discussed. The fingerprint and annoyance score for the new annoying sound is transmitted from the ANC server to the smartphone. Under the control of the ANC app, the fingerprint and annoyance score for the new annoying sound received from the ANC server is uploaded into the memory 208 of the ear-worn electronic device 200 for use by the processor 204 and active noise control system 206.

For convenience, active noise control processes are described herein as being implemented by a processor (e.g., processor 204), which can be representative of any combination of one or more logic devices (e.g., multi-core processors), filters (e.g., FIR filter, Kalman filter), memory (Flash, RAM, ROM etc.), other digital logic circuitry (e.g., ASICs, FPGAs), and sofware configured to implement active noise control in a manner described herein (e.g., via active noise control system 206).

In general, the active noise control techniques described herein may be implemented in hardware, software, firmware, or any combination thereof. Various features described or illustrated as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques disclosed herein may be realized at least in part by a computer-readable data storage medium (e.g., ROM, RAM, SDRAM, NVRAM, EEPROM, FLASH) comprising instructions that, when executed, cause a processor to perform one or more of the methods described herein. For example, the computer-readable data storage medium may store such instructions for execution by a processor.

The code or instructions may be software and/or firmware executed by processing circuitry including one or more processors, such as one or more DSPs, general purpose microprocessors, ASICs, FPGAs, ASSPs, or other equivalent integrated or discrete logic circuitry. Accordingly, the term "processor," as used herein may refer to any of the foregoing structures or any other structure suitable for implementation of the techniques described herein. In addition, in some aspects, functionality described in this disclosure may be provided within software modules or hardware modules. These and other aspects are within the scope of the claims appended hereto.

Figure 3:
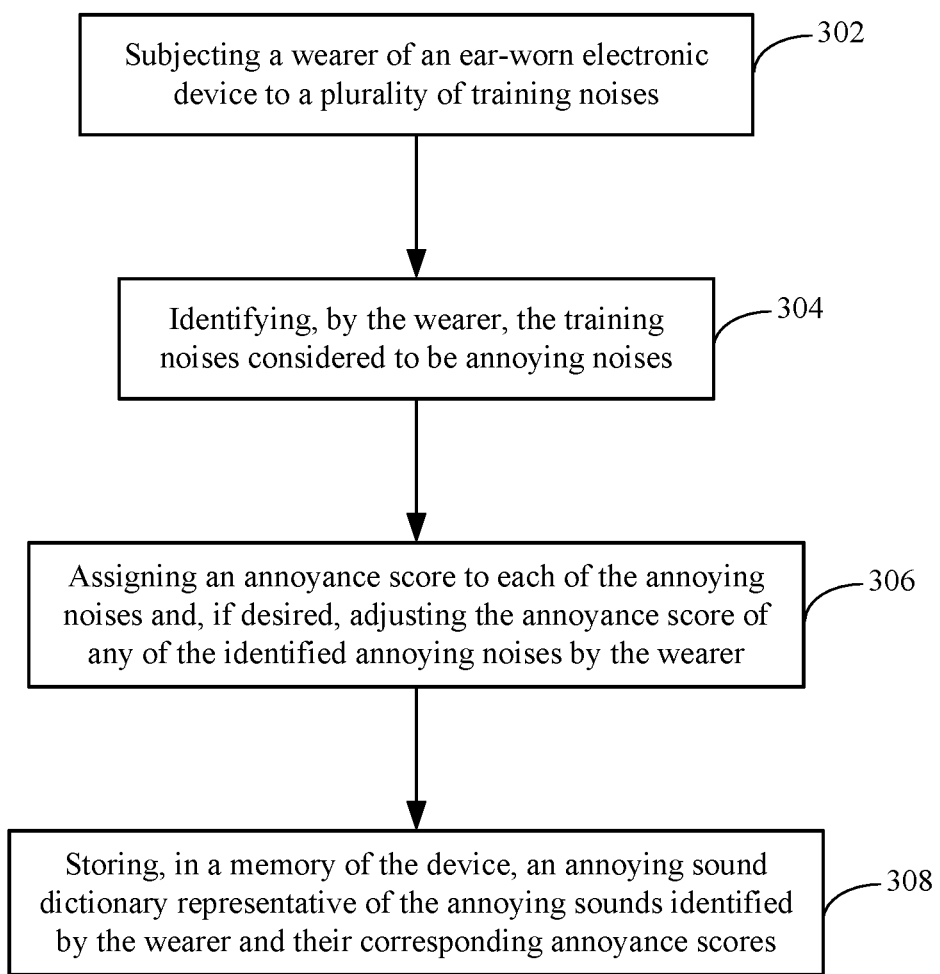
FIG. 3 illustrates a method for training an annoyance model driven selective ANC system of an ear-worn electronic device in accordance with various embodiments.

FIG. 3 illustrates a method for training an annoyance model driven selective ANC system of an ear-worn electronic device in accordance with various embodiments. The method illustrated in FIG. 3 involves subjecting 302 a wearer of an ear-worn electronic device to a plurality of training noises. The method involves identifying 304, by the wearer, the training noises considered to be annoying noises. The method also involves assigning 306 an annoyance score to each of the annoying noises and, if desired, adjusting the annoyance score of any of the identified annoying noises by the wearer. The method further involves storing 308, in a memory of the device, an annoying sound dictionary representative of the annoying sounds identified by the wearer and their corresponding annoyance scores.

Figure 4:
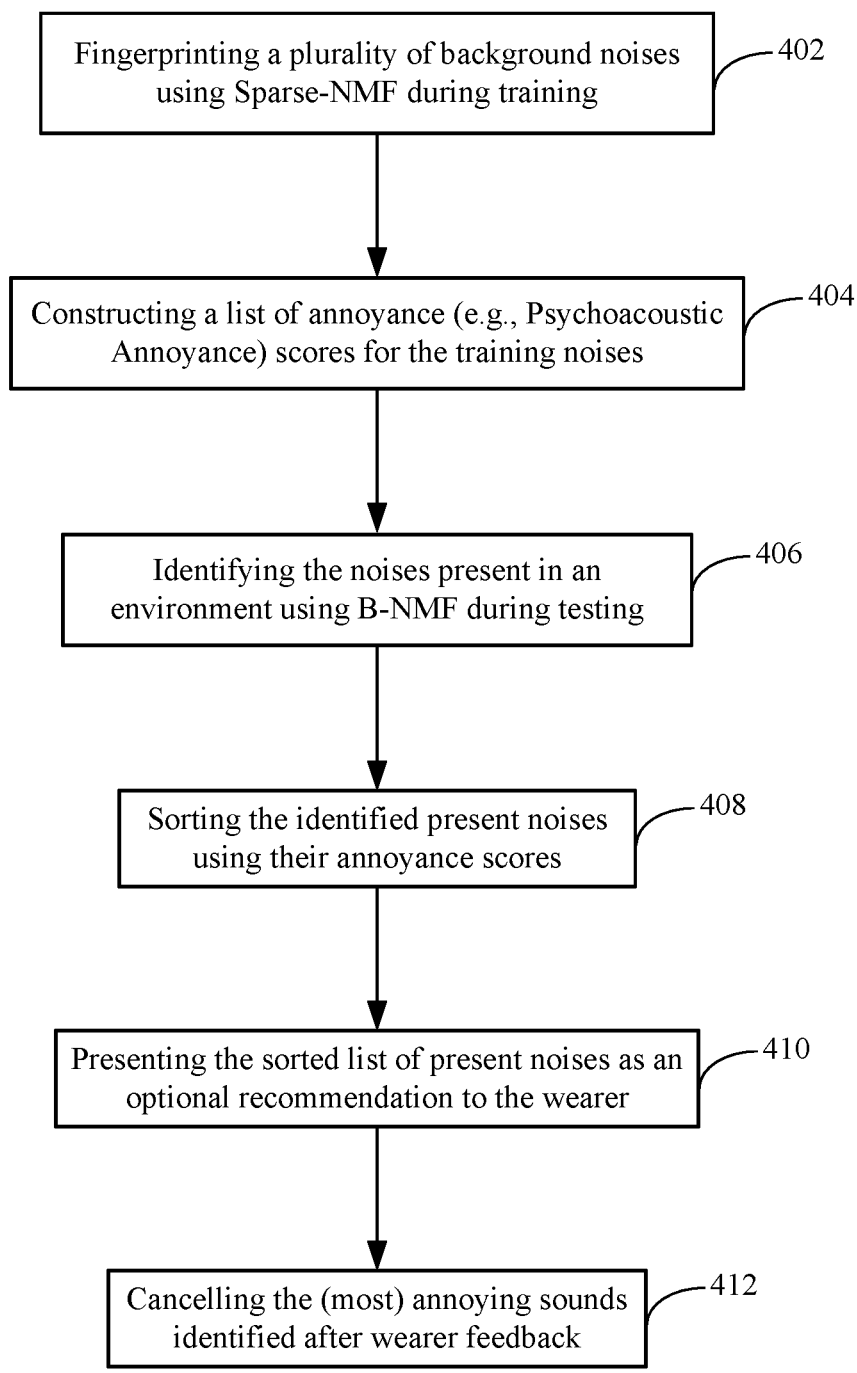
FIG. 4 illustrates a method for training and in-field use of an ear-worn electronic device incorporating an annoyance model driven selective ANC system in accordance with various embodiments.

FIG. 4 illustrates a method for training and actual use of an ear-worn electronic device incorporating an annoyance model driven selective ANC system in accordance with various embodiments. The method illustrated in FIG. 4 involves fingerprinting 402 a plurality of background noises using Sparse-NMF (S-NMF) during training. The method involves constructing 404 a list of annoyance (e.g., Psychoacoustic Annoyance) scores for the training noises. The method involves identifying 406 the noises present in an environment using B-NMF during testing. The method also involves sorting 408 the identified present noises using their annoyance scores. The method further involves presenting 410 the sorted list of present noises as an optional recommendation to the wearer. The method also involves canceling 412 the annoying sounds (e.g., the most annoying sounds) identified after wearer feedback.

Embodiments are directed to an ear-worn electronic device which incorporates a system that enables the cancellation of noises with known spectral fingerprints identified during an online processing testing stage (e.g., via B-NMF). The system offers flexibility by allowing learning of new annoying noise types with complex spectral structure, e.g., by recording and analyzing the disturbing noises using a reference microphone of the ear-worn electronic device or a microphone accessible to the device, such as a remote microphone in a hearing aid application, and adapting the system accordingly. Moreover, the system provides for the selective cancellation of a combination of learned annoying noises. The system can be driven automatically based on a psychoacoustically motivated annoyance model. This model provides for the assignement of an annoyance score to each of these noise types. Once the ANC system detects any of the learned noise types, the active noise canceler adapts the loudspeaker signal to selectively cancel the noises with the highest annoyance score at an error microphone.

Figure 5:
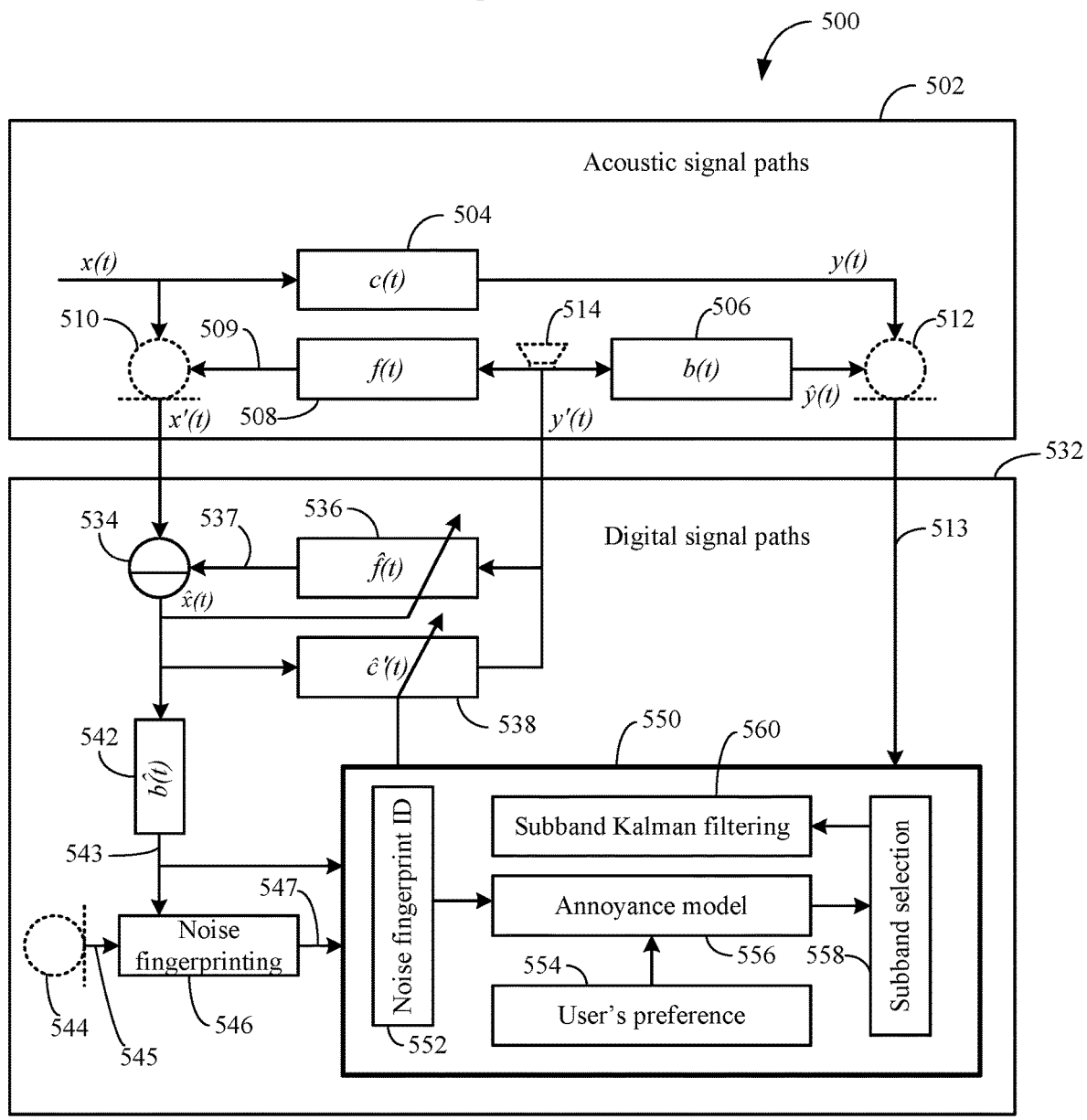
FIG. 5 illustrates architecture of an annoyance model driven selective ANC system configured for use in an ear-worn electronic device in accordance with various embodiments.

FIG. 5 illustrates architecture of an annoyance model driven selective ANC system configured for use in an ear-worn electronic device in accordance with various embodiments. The ANC system 500 shown in FIG. 5 includes an acoustic signal path block 502 and a digital signal path block 532. The acoustic signal path block 502 includes a primary acoustic path 504 which receives an actual signal, x(t), which contains noise. The primary acoustic path 504 models the direct acoustic path through the ear canal, and outputs a modeled signal, y(t), to an ear canal microphone 512. The actual signal, x(t), is also picked up by a reference microphone 510 of the ear-worn electronic device. In some configurations, the reference microphone 510 can be a remote microphone, such as a microphone of a smartphone, a microphone of a second ear-worn electronic device positioned away from the wearer, or a microphne of a charging unit configured to recharge a battery of the ear-worn electronic device.

The acoustic signal path block 502 also includes a secondary acoustic path 506, which receives a loudspeaker signal, y'(t), and outputs a signal, ŷ(t), to the ear canal microphone 512. The secondary acoustic path 506 defines a transfer function from the loudspeaker 514 to the ear canal microphone 512. An ear canal microphone signal 513 output from the ear canal microphone 512 is communicated to the digital signal path block 532. The loudspeaker signal, y'(t), is also input to an actual feedback path 508, which outputs a feedback signal 509 to the reference microphone 510. The reference microphone 510 receives the actual noise signal x(t) and the feedback signal 509, and outputs a reference microphone signal, x'(t), to the digital signal path block 532.

The digital signal path block 532 includes a subtractor 534 which receives the reference microphone signal, x'(t), from the reference microphone 510 and a signal 537 from an adaptive feedback cancellation filter 536. A signal x̂(t) is output from the subtractor 534, used to update the adaptive feedback cancellation filter 536, and communicated to a selective noise attenuation filter 538. The selective noise attenuation filter 538 is configured to remove annoying sounds from a loudspeaker signal, y'(t), which is transmitted from a loudspeaker 514 of the ear-worn electronic device to the wearer's ear drum. The loudspeaker signal, y'(t), is also transmitted as an input to the adaptive feedback cancellation filter 536, and is used to update the adaptive feedback cancellation filter 536.

The signal, x̂(t), output from the subtractor 534 is also input to an estimated secondary path filter 542, which is estimated to approximate the true secondary acoustic path 506. A signal 543 at an output of the estimated secondary path filter 542 is communicated to a noise fingerprinting module 546, which is configured to determine if one or more annoying noises is present. The noise fingerprinting module 546 can also receive an input from an external remote microphone 544 which monitors the surrounding acoustic environment. The external remote microphone 544 generates a signal 545 which is input to the noise fingerprinting module 546.

The digital signal path block 532 also includes a processing block 550 which receives signal 543 from the estimated secondary path filter 542, signal 547 from the noise fingerprinting module 546, and the ear canal microphone signal 513 from the ear canal microphone 512. The processing block 550 includes a noise fingerprints ID module 552 configured to identify an annoying sound based on the noise fingerprints received from the noise fingerprinting module 546. An output of the noise filtering ID module 552 is input to an annoyance model 556. A user's preference module 554 is also coupled to the annoyance model 556.

The user's preference module 554 provides pre-defined user preferences to the annoyance model 556. The pre-defined user preferences include the various annoying sounds pre-identified by the wearer and, in some embodiments, the pre-identified degree of attenuation associated with each of the annoying sounds. The pre-defined user preferences also include the Psychoacoustic Annoyance (PA) scores (as modified by the wearer) associated with the annoying sounds pre-identified by the wearer. In some embodiments, the pre-defined user preferences include a PA threshold pre-identified by the wearer, such that annoying sounds having a PA score greater than or equal to the PA threshold will be canceled. The PA threshold can be modified as desired by the wearer. In this way, the most annoying sounds as determined by the wearer can be canceled by the ANC system.

The annoyance model 556 is configured to determine which subband is to be selected by a subband selection module 558 to cancel each annoying sound provided by the user's preference module 554. The appropriate cancellation filter coefficients are determined by a subband Kalman filtering module 560 for the subband selected by the subband selection module 558. The filter coefficients determined by the subband Kalman filtering module 560 are communicated to the selective noise attenuation filter 538.

The following decription is directed to an embodiment of an annoyance model driven selective ANC system configured for use in an ear-worn electronic device. It is understood that the embodiment described below represents one of many different approaches to implementing an annoyance model driven selective ANC system configured for use in an ear-worn electronic device.

Fingerprinting of Background Noise

In the description below, and with continued reference to FIG. 5, the reference microphone signal, x'(t), shown at an output of the reference microphone 510, in the general case, can be decomposed into an actual noise signal, x(t), and a feedback signal 509 as depicted in FIG. 5. A loudspeaker signal, y'(t), supplied to the loudspeaker 514 is optimized to minimize the error between signal y(t):=x(t) * c(t) and ŷ(t)=b(t) * y'(t) (shown at ear canal microphone 512) in the least squares sense, where c(t) is the primary acoustic path 504, and b(t) denotes the secondary acoustic path 506. Hence, the estimated filter coefficients ĉ'(t) of the selective noise attenuation filter 538 can be thought as an estimation of the convolution of the primary acoustic path (c(t))504 with the inverse of the secondary acoustic path (b(t)) 506. In the description of this embodiment, and for ease of representation, the seondary acoustic path (b(t)) 506 and the actual feedback path (f(t)) 508 are simplified by assuming there is no acoustic feedback and that the secondary acoustic path (b(t)) 506 is to be a zero delay impulse. In this description, capital letters are used for subband decomposed entities.

As shown in FIG. 5, the ANC system 502 is configured to analyze the background acoustic environment using a signal obtained by the reference microphone 509 or any remote microphone 544 (such as smartphone microphone) to identify the noises present in the acoustic environment based on the noise fingerprints learned during training. Different variants of a Non-negative Matrix Factorization technique are used for both fingerprinting and identification of noise, since NMF is useful for event detection and noise classification tasks.

Training Stage

An offline training stage is implemented to learn the corresponding dictionary as fingerprints for D different types of noises, by solving the following optimization problem D times, for d=1. . . D.

$$W_{N_d}, H_{N_d} = \arg\min_{W,H} KL(N_d|WH) + \mu|H|_1, \quad (1)$$

where $N_d \in K$(number of bins)×L (number of frames) is the magnitude of the $d^{th}$ training noise subband reprsentation, and KL(·|·) denotes the KL divergence. This optimization problem can be solved in an iterative manner using multiplicative updates. During an online training stage, a list $f_d$ for d=1, . . . , D of minimum number of subband indices for each noise is created, such that it satisfies, $$\frac{\|N_d(f_d,:)\|_{fro}}{\|N_d\|_{fro}} \geq 0.75 \quad (2)$$

This list essentially encodes the spectral structure of each training noise, and stores the subband indices where that particular noise is most dominant.

Testing Stage

An online testing stage is implemented to classify the background acoustic environment using the trained dictionaries. A soft classification is used, such that each noise type is assigned a soft membership score. It is noted that this soft classification process is unique and not utilized by conventional ANC systems.

Consider a test case, where the magnitude of the subband representation of the background noises (e.g., remote microphone recording) is M. During the soft classification stage, the aim is to decompose M as a linear non-negative combination of pre-trained noise subdictionaries ($W_{N_d}$). Similar to training stage processes, this decomposition can be performed by optimizing the following criterion, $\min_{H>0} KL(M|WH)$, where the dictionary matrix W is obtained by concatenating all the noise subdictionaries, $W=[W_{N_1}, \ldots, W_{N_d}, \ldots, W_{N_D}]$. Since W is an overcomplete dictionary, a sparseness constraint over the activation matrix H is typically employed leading to Sparse-NW (S-NMF).

In this illustrative embodiment, a more structured sparsity constraint has been identified as useful. Since the noise dictionary W is essentially a concatenated version of D subdictionaries, it is assumeed that a similar block structure can also be expected in each frame of the activation matrix, i.e., $H_{(:,l)}$. Intuitively, this represents the fact that, during testing, if a basis vector of a specific subdictionary contributes to represent the testing frame, the other basis vectors of that specific subdictionary will also contribute. Hence, in the $l^{th}$ activation vector, a block sparsity structure can be expected. To impose this structural constraint, the following regularization term is included in the cost function, $R(H)=\Sigma_{l=1,\ldots,L}\Sigma_{gi \in G} \log (\|H_{(gi,l)}\|_2^2+\varepsilon)$, where $G=[g_1, \ldots, g_D]$ represents the D noise subspaces. This regularization term is also known as the log-$\ell$ measure, and it has been shown that this regularization corresponds to a block rectified generalized double pareto (BRGDP) distribution, which is a multivariate version of the rectified generalized double pareto (GDP), as a prior probability distribution over the activation matrix H.

Hence, during the testing stage, the following regularized cost function is optimized:

$$\hat{H} = \arg\min_{H>0} KL(M|WH) + \mu R(H), \quad (3)$$

This optimization problem can also be solved using multiplicative update rules in an iterative way as shown in S-NMF. Because of the block sparse structure, the update rule of the activation matrix H becomes $$H^{t+1} = H^t \otimes \frac{W^T(M \otimes \Delta_t^{-1})}{W^T + \frac{\mu}{S^t + \varepsilon}} \quad (4)$$

where $\Delta_t = WH^t$, and $S_{(gi,l)}^t = \|H_{(gi,l)}^t\|_1$, for l=1, . . . , L number of frames.

The estimated activation matrix, $\hat{H}$, is used to analyze the background acoustic environment by assigning the soft membership score to all the training noises using the following definition:

$$\text{membership}(d) = \frac{\|\hat{H}_{(g_d,1:L)}\|_{fro}}{\|\hat{H}_{(:,1:L)}\|_{fro}} \quad (5)$$

for d=1, . . . , D. It is noted that L frames have been used to compute the soft membership scores. With a suitable choice of L, the noise fingerprinting component can be made adaptive to account for the dynamic nature of the surrounding acoustic environment.

Psychoacoustic Annoyance Model

In psychoacoustics literature, many approaches have been proposed to objectively predict the annoyance based on the different sound attributes such as sharpness, roughness, fluctuation strength, tonalness, etc. However, because of the subjective nature of the annoyance measure, these different models often result in conflicting results. To quantify the noise induced annoyance in this illustrative embodiment, the well known Zwicker's annoyance model is used as an initialization for an adaptive model that can learn from the user's input. Zwicker's model combines the roughness, fluctuation strength, loudness, and sharpness to calculate a scalar annoyance measure, referred to as the Psychoacoustic Annoyance (PA) measure, which is given as:

$$PA = N_5[1+\sqrt{w_s^2 + w_{FR}^2}] \quad (6)$$

where, $w_s = 0.25(S-1.75) \log_{10}(N_5+10)$ for $S>1.75$, and $$w_{FR} = \frac{2.18}{(N_5)^{0.4}}(0.4F + 0.6R).$$

In equation (6), S is sharpness, F is fluctuation strength, R is roughness, and $N_5$ is Loudness exceeded 5% of the time. In this illustrative embodiment, since the PA scores are computed using the whole of training data, the sharpness, fluctuation strength, and roughness value that exceeded 5% of the time (95 percentile) are used in equation (6).

Table 1 below lists a number of PA measures that have been computed for different noises.

TABLE 1

| Noise Type | PA Measure |
| --- | --- |
| Snoring (Male) | 18.10 |
| Telephone Ringing | 15.97 |
| Vehicle Alarm | 14.01 |
| Emergency Broadcasting | 8.18 |
| Smoke Alarm | 9.51 |
| Shopping Center | 9.67 |

The primary shortcoming of Zwicker's annoyance model is that it does not include effects of tonalness. As a consequence, very tonal noises considered to be highly annoying are not indicated as such using Zwicker's annoyance model. This is reflected in the PA measures for a variety of sounds considered generally as very annoying. For example, a Time magazine article entitled "Top 10 Most Annoying Sounds" (Jun. 2010) listed Smoke Alarm and Emergency Broadcasting sound as among the top 10 most annoying sound, but the PA measures provided by Zwicker's model indicate otherwise. Hence, the adaptation of a list of most annoying sounds (and/or other annoying sounds identified by the user) using user feedback is desireable.

In practice, based on the soft membership scores, it is inferred that the top k number of noises are present in the acoustic environment. This list of $N_c$ noises can be sorted based on their PA measures (computed during training), and the sorted list can be presented to the user. The user can either choose to cancel one or more annoying sounds present in the environment based on the system recommendation, or can provide his/her own input, on which noise is most annoying, and wants it to be canceled. If the user input is different than the system recommendation, the stored PA measure list for different noises can be adapted to reflect the user's preference.

Adaptive Noise Control

Due to the strict delay requirements, adaptive noise control systems are often implemented in the time domain. It is well known that correlated input signals cause low convergence rates to the time domain adaptive filters. To circumvent this problem, adaptive filtering is typically performed in a suitable transform domain. The subband adaptive filtering allows band selective regularization and enhances the eigenvalue spread in each subband. One drawback of adaptation in a subband domain is the introduction of processing delay by the analysis and synthesis filterbanks. To keep this delay at a minimum, a low-delay filterbank is used, such as a delayless adaptive filtering structure. Additionally, an adaptation algorithm is used that converges quadratically and is able to track fast changes in the primary acoustic paths Complex Low-Delay Subband Decomposition It has been shown that the reconstruction delay of a filterbank can be reduced independently of the filter length while still maintaining the perfect reconstruction property. Increasing the filter length allows for high stop band attenuation which is of high importance in the illustrative adaptive filtering case as it enables the system to perform the adaptation on the subband channels independently. From a complexity point of view, modulated filterbanks are a useful filterbank implementaion.

In a general approach to derive perfect reconstruction, low-delay modulated filterbanks can be used. Perfect reconstruction low-delay filterbanks (PR-LDFB) are known to have non-linear phase. Hence, PR-LDFBs have group delay which may change with frequency, which limits their application in spectral modification tasks. The employment of phase equalizers as allpass filters can be used to effectively handle these phase distortions. In this ilustrative embodiment, a known approach to designing the filterbank's prototype window is used (see, e.g., P. N. Heller, T. Karp, and T. Q. Nguyen, "A general formulation of modulated filter banks," *IEEE Transactions on Signal Processing*, vol. 47, no. 4, pp. 986-1002, Apr. 1999). This approach provides a tradeoff between several optimization aspects and offers an explicit control over the introduced phase distortion. Hence, a near perfect reconstruction low-delay filterbank can be obtained with high aliasing attenuation and limited phase distortions.

Kalman Filtering Based Active Noise Control

After identifying the most annoying noises in a manner discussed above, the list $f_c$ (see Equation (2) above) is chosen, where c is the most annoying noise. Adaptive cancellation is performed in subbands that are on the list $f_c$. In order to track the primary acoustic path changes, an explicit dynamic system model can be employed. A particularly convenient stochastic model for a time-varying system C is the first-order recursive Markov chain:

$$C(k, n+1) = A \cdot C(k, n) + U(k, n), \quad (7)$$

where A is often chosen as a diagonal matrix with diagonal elements in the range [0,1], and $C(k, n) := [C^0(k, n), C^1(k, n), \ldots, C^L(k, n)]$ is a vector of the L coefficients of the primary path in the k-th subband at the block indexed n. U(k, n) refers to the process noise vector in the k-th subband characterized as multivariate Gaussian process with zeros mean and a covariance matrix estimated by $R_u := \varepsilon\{UU^H\}$ where $\{\cdot\}^H$ stands for Hermitian transposition. The measurement is modeled by the following equation:

$$Y(k, n) = X^H(k, n) \cdot C(k, n) + N(k, n), \quad (8)$$

where N(k, n) denotes the measurement noise with the covariance $R_N$, X(k, n) is the reference noise signal, and Y(k, n) represents the reference noise signal as filtered by the primary path. An adaptive filter that calculates an optimal estimate $\hat{C}$ for a dynamic system described by the given process and measurement model is a Kalman filter. It is noted that $\hat{C}'$ is equal to $\hat{C}$ as the secondary acoustic path is assumed to be a Dirac impulse. Kalman filtering is widely used in a variety of audio applications. A derivation for a subband implementation can be found, for example, in W.-R. Wu and P.-C Chen, "Subband Kalman filtering for speech enhancement," *IEEE Transactions on Circuitrs and Systems II: Analaog and Digital Signal Processing*. vol. 45, no. 8, pp. 1072-1083, Aug. 1998. The adaptation steps of this implementation can be summarized as follows:

$$\hat{C}(k, n+1) = A\hat{C}^+(k, n), \quad (9)$$

$$P(k, n+1) = A^2 P^+(k, n) + R_u, \quad (10)$$

$$E(k, n) = Y(k, n) - X^H(k, n) \cdot \hat{C}(k,n), \quad (11)$$

$$\hat{C}^+(k, n) = \hat{C}(k, n) + K(k, n)E(k, n), \quad (12)$$

$$P^+(k, n) = [I_M - K(k, n)X^H(k,n)]P(k, n), \quad (13)$$

$$K(k,n) = P(k, n)X(k, n) \quad (14)$$

$$[X^H(k, n)P(k,n)X(k,n) + R_N(k,n)]^{-}. -1em \quad (15)$$

In order to exploit the full potential of Kalman filtering and its robustness to variations of the measurement noise power, a time varying estimation of $R_N$ can be used. To obtain this estimation, the covariance of the error signal E (k, n) can be used, as it represents a good estimate of the measurement noise in the case of successful state estimation (see, e.g., G. Enzner and P. Vary, "Frequency-domain Adaptive Kalman Filter for Acoustic Echo Control in Hands-free Telephones," Signal Process., vol. 86, no. 6, pp. 1140-1156, June 2006. [Online]. Available: http://dx.doi.org/10.1016/j.sigpro.2005.09.013).

Real-time Implementation Design

Delay-less adaptive filtering is a type of subband adaptive filter architecture in which the adaptive weights are computed in subbands, but collectively transformed into an equivalent set of wideband filter coefficients. In this manner, signal path delay is avoided while retaining the computational and convergence speed advantages of subband processing. This architecture is especially important in the case of ANC system where the digital delay needs to be kept below the acoustic delay. It is noted that the usage of delay-less adaptive filters with a low-delay filterbank involves employment of a phase equalization scheme and a traditional delay-less structure may need to be slightly modified.

Experimental Results

An ANC system of an ear-worn electronic device of the type discussed herein (e.g., see FIG. 5 and discussion hereinabove) was simulated by the inventors, results of which are discussed below. Various metrics were produced and the performance of the ANC system was evaluated. The attenuation was calcuated by means of signal-to-interference ratio (SIR), which is analogous to the common definition in the source separation context. Additionally, the achieved signal's signal-to-distortion ratio (SDR) was calcuated using the same evaluation tool. These metrics are tabulated in Table 2 below. Also calculated were the PA measures of the stimuli along with the PA measures of the signal (that the user is listening to) after selective cancellation of the annoying noise. These metrics are tabulated in Table 3 below. These PA measurements demonstrate the efficacy of the ANC system in canceling the selected annoying sounds.

Experimental Setup

For training the ANC system, ten different types of sounds were used: Snoring, Telephone ringing, Vehicle alarm, Emergency broadcasting, Smoke alarm, Pub noise, Babble noise, Shopping center noise, Street traffic noise, and Male speech. For each type of sound, a subdictionary with 20 basis vectors was learned over the magnitude of subband representation. Hence, the concatenated training sound dictionary has 200 bases.

The simulated ANC system represents an occluded hearing system, and it was assumed that the secondary acoustic path is a Dirac impulse. The forward path was also randomly generated as a FIR filter of 50 taps, where the tap coefficients were generated from a Normal distribution with mean 0 and variance 1. For the input stimuli, 5 mixtures of two different sources (same level) were generated using a different segment that was not seen by the ANC system during training. The length of each mixture was 10 seconds. Some of the annoying sounds that are encountered in daily life were chosen as the individual sources. Below is a list of the details of the chosen 5 mixtures:

Mixture 1: This mixture consists of a phone ringing sound with pub noise. This mixture simulates the annoying scenario where someone's phone is constantly ringing in a pub, and is really annoying the user. For this mixture, the user wants the ANC system to selectively cancel the phone ringing sound.

Mixture 2: This mixture consists of a vehicle alarm sound and street traffic noise. In this scenario, the user finds the car alarm sound really annoying and wants the ANC system to cancel the car alarm sound while maintaining his acoustic awareness.

Mixture 3: This mixture consists of a smoke alarm sound and speech. In this scenario, a neighbor's smoke alarm is active, and is not allowing the user to communicate with his friend in his own home. In this scenario, the user wants the ANC system to selectively cancel the smoke alarm sound, while still allowing the user to communicate with his friend.

Mixture 4: This mixture consists of an emergency broadcasting sound and speech. In this scenario, the user is annoyed by the emergency broadcasting sound, and wants the ANC system to cancel this annoying sound, but still wants the speech to pass through.

Mixture 5: This mixture consists of a male snoring sound and a telephone ringing sound. This scenario simulates a situation where the user finds her significant other's snoring sound very annoying and wants the ANC system to cancel it, but still wants to be aware of any emergency phone call and/or alarm clock sound.

Experimental Evaluation

The simulation results are summarized in Tables 2 and 3 below.

TABLE 2

| Mixture | Suppressed Noise | SIR | SDR |
|---|---|---|---|
| Mixture 1 | Phone ringing | 19.8 | 11.5 |
| Mixture 2 | Vehicle alarm | 15.8 | 5.2 |
| Mixture 3 | Smoke alarm | 18.8 | 7.9 |
| Mixture 4 | Emergency broadcasting sound | 15.6 | 13.7 |
| Mixture 5 | Snoring | 11.6 | 8.5 |

TABLE 3

| Mixture | Input PA Score | Out PA Score |
|---|---|---|
| Mixture 1 | 16.8 | 13.3 |
| Mixture 2 | 15.2 | 12.8 |
| Mixture 3 | 14.5 | 12.0 |
| Mixture 4 | 12.4 | 11.8 |
| Mixture 5 | 17.2 | 12.7 |

Table 2 presents the experimental results in terms of SDR and SIR for all 5 mixtures using the well known bsseval toolbox. The SDR and SIR metrics provide objective measures of annoying sounds cancelation by the ANC system. Table 3 presents the PA measure before any cancellation, denoted as Input PA Score, and the PA measure after the selective cancellation of each of the annoying sounds, denoted as Out PA Score. For all mixtures, it is evident from the results tabluated above that the simulated ANC system is making the surrounding acoustic environment less annoying for the users. For mixture 4, where the ANC system is canceling the 'Emergency Broadcasting sound', the improvement in PA measure is nominal. This can be explained by the fact that Zwicker's annoyance model does not account for tonality in stimuli, as previously discussed. Hence, even though the 'Emergency Broadcasting sound' is very annoying subjectively, the PA measure is not reflecting that. Finally, the greatest improvement in PA measure is realized for mixture 5, where the male snoring sound is canceled. This is expected since Zwicker's annoyance model assigns the highest annoyance measure for snoring sound as shown in Table 1 above.

Conclusion

The experimental results tabulated above demonstrate that a selective ANC system according to embodiments of the disclosure effectively cancels only the most annoying sounds present in the surrounding acoustic environment of the user, while allowing all other sounds to pass. Since annoyance is a very subjective measure, a phychoacoustic annoyance model can be employed by the ANC system to facilate cancelation of annoying sounds in the acoustic environment. The annoying sounds canceled by the ANC system can constitute a generic listing of known annoying sounds, which can be added to and/or adjusted by each indivdual user. The simulated ANC system has been shown to be very effective in canceling the annoying sounds in the 5 simulated scenarios describe above, using both objective metrics from bsseval toolbox (see Table 2) and also using a Psychoacoustic Annoyance (PA) measure (see Table 3).

Figure 6:
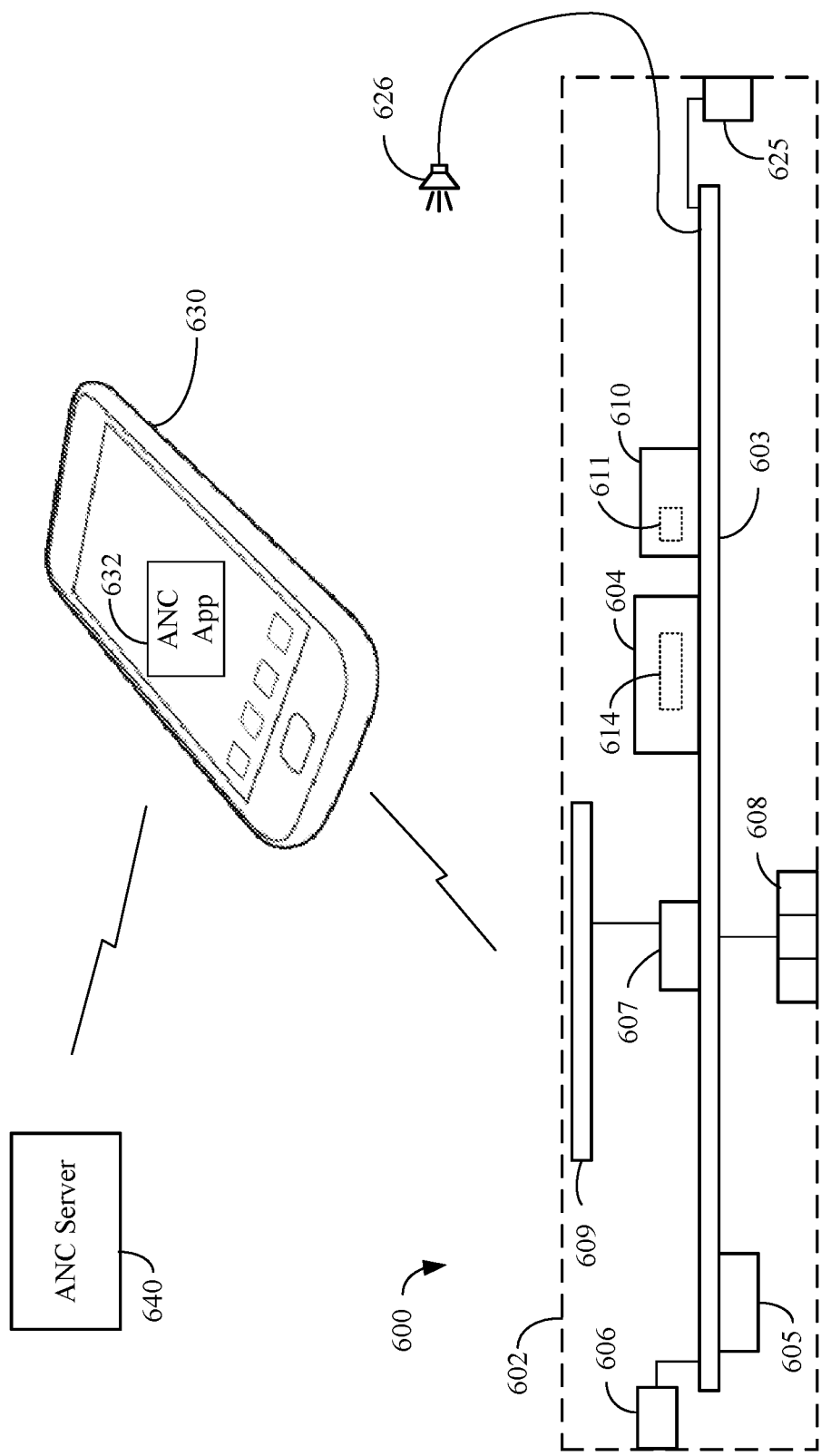
FIG. 6 is a block diagram showing various components of an ear-worn electronic device that can be configured to incorporate an annoyance model driven selective ANC system in accordance with various embodiments.

The embodiments described herein are directed to an active noise control system configured to selectively attenuate annoying sounds present in the surrounding acoustic environment for use in an ear-worn electronic device. A number of representative ear-worn electronic devices are described herein which incorporate an annoyance model driven ANC system configured to selectively attenuate annoying sounds pre-identified by the wearer. FIG. 6 is a block diagram showing various components of an ear-worn electronic device 600 that can be configured to incorporate an annoyance model driven selective ANC system in accordance with various embodiments. The block diagram of FIG. 6 shows an ear-worn electronic device 600 that can incorporate the embodiments shown in FIGS. 2 and 5, and implement the functionality illustrated in FIGS. 1, 3, and 4 and described hereinabove. It is understood that an ear-worn electronic device 600 may exclude some of the components shown in FIG. 6 and/or include additional components. It is also understood that the ear-worn electronic device 600 illustrated in FIG. 6 can be either a right ear-worn device or a left-ear-worn device. The components of the right and left ear-worn devices can be the same or different.

The ear-worn electronic device 600 shown in FIG. 6 includes an enclosure 602 within which several components are electrically connected to a mother flexible circuit 603. A battery 605 is electrically connected to the mother flexible circuit 603 and provides power to the various components of the ear-worn electronic device 600. One or more microphones 606 are electrically connected to the mother flexible circuit 603, which provides electrical communication between the microphones 606 and a DSP 604. Among other components, the DSP 604 can incorporate or be coupled to audio signal processing circuitry. In addition to the DSP 604, one or more other processors and/or electronic circuits can be included to implement an annoyance model driven selective ANC system 614 in accordance with various embodiments. A memory 610, which may be separate from or integral to the DSP 604, is configured to store an annoying sound dictionary 611 representative of a plurality of annoying sounds pre-identified by the wearer. Annoyance (e.g., PA) scores and user preferences can also be stored in the memory 610. One or more user switches 608 (e.g., on/off, volume, mic directional settings, mode selection, add new annoying sound) are electrically coupled to the DSP 604 via the flexible mother circuit 603.

In some embodiments, the DSP 604 has an audio output stage coupled to a speaker 625. In other embodiments, the audio output stage of the DSP 604 is coupled to a receiver 626. The ear-worn electronic device 600 may incorporate a communication device 607 coupled to the flexible mother circuit 603 and to an antenna 609. The communication device 607 can be a Bluetooth® transceiver, such as a BLE (Bluetooth® low energy) transceiver or other transceiver (e.g., an IEEE 802.11 compliant device). The communication device 607 can be configured to communicate with an external device 630, such as a smartphone, tablet or laptop, in accordance with various embodiments. The external device 630 can store and execute an ANC app 632 which allows the wearer to interact with the ANC system 614 of the ear-worn electronic device in a manner previously described. The ANC app 632 may also provide for communication between the ear-worn electronic device 600 and an ANC server 640 via the cloud (e.g., the Internet), such as for adding new annoying sounds to the ANC system 614 by the wearer as discussed previously.

This document discloses numerous embodiments, including but not limited to the following:

Item 1 is a method implemented by an ear-worn electronic device configured to be worn by a wearer, the method comprising:

storing, in a memory of the device, an annoying sound dictionary representative of a plurality of annoying sounds pre-identified by the wearer;

monitoring, by the device, an acoustic environment of the wearer;

identifying, by a processor of the device, different background noises present in the acoustic environment;

determining, by the processor, which of the background noises corresponds to one or more of the plurality of annoying sounds pre-identified by the wearer; and attenuating, by the processor, the one or more annoying sounds in an output signal provided to a speaker or a receiver of the device.

Item 2 is the method of item 1, wherein the processor attenuates only the one or more annoying sounds while passing all other sounds present in the acoustic environment.

Item 3 is the method of item 1, wherein:
the processor determines that a multiplicity of the background noises correspond to a multiplicity of the annoying sounds; and
the processor attenuates the multiplicity of annoying sounds in the output signal.

Item 4 is the method of item 1, wherein the processor attenuates each of the one or more annoying sounds in the output signal by a degree of attenuation pre-identified by the wearer.

Item 5 is the method of item 1, wherein the processor uses an audiogram of the wearer to attenuate each of the one or more annoying sounds.

Item 6 is the method of item 1, comprising adding an additional annoying sound identified by the wearer to the annoying sound dictionary.

Item 7 is the method of item 1, wherein the processor:
implements Block Sparse Non-negative Matrix Factorization to identify the different background noises; and
assigns a soft membership score to each of the background noises.

Item 8 is the method of item 1, comprising:
storing a psychoacoustical annoyance score for each of the plurality of annoying sounds in the memory of the device; and
assigning, by the processor, a soft membership score to each of the background noises;
wherein the processor attenuates the one or more annoying sounds in the output signal using the psychoacoustical annoyance scores and the soft membership scores.

Item 9 is the method of item 8, wherein the processor attenuates annoying sounds in the output signal that have a psychoacoustical annoyance score above an annoyance threshold pre-identified by the wearer.

Item 10 is the method of item 1, comprising:
storing a psychoacoustical annoyance score of each of the plurality of annoying sounds in the memory of the device;
sorting the background noises present in the acoustic environment using the psychoacoustical annoyance scores of the background noises;
presenting the sorted background noises to the wearer;
identifying, by the wearer, which of the sorted background noises are annoying sounds; and
attenuating, by the processor, the annoying sounds identified by the wearer.

Item 11 is the method of item 1, comprising determining subbands in which attenuations are applied to for the one or more annoying sounds.

Item 12 is the method of item 11, wherein determining the subbands comprises determining the subbands by an annoyance model configured to receive noise fingerprint identifications of the annoying sounds and annoying sound preferences of the wearer.

Item 13 is an ear-worn electronic device configured to be worn by a wearer, comprising:
a processor;
a memory coupled to the processor, the memory configured to store an annoying sound dictionary representative of a plurality of annoying sounds pre-identified by the wearer;
a microphone coupled to the processor and configured to monitor an acoustic environment of the wearer; and
a speaker or a receiver coupled to the processor;
wherein the processor is configured to identify different background noises present in the acoustic environment, determine which of the background noises correspond to one or more of the plurality of annoying sounds, and attenuate the one or more annoying sounds in an output signal provided to the speaker or receiver.

Item 14 is the device of item 13, wherein the processor is configured to attenuate only the one or more annoying sounds while passing all other sounds in the acoustic environment.

Item 15 is the device of item 13, wherein the processor is configured to:
determine that a multiplicity of the background noises correspond to a multiplicity of the annoying sounds; and
attenuate the multiplicity of annoying sounds in the output signal.

Item 16 is the device of item 13, wherein the processor attenuates each of the one or more annoying sounds in the output signal by a degree of attenuation pre-identified by the wearer.

Item 17 is the device of item 13, wherein the processor is configured to attenuate each of the one or more annoying sounds using an audiogram of the wearer.

Item 18 is the device of item 13, wherein the processor is configured to add an additional annoying sound identified by the wearer to the annoying sound dictionary.

Item 19 is the device of item 13, wherein the processor is configured to:
implement Block Sparse Non-negative Matrix Factorization to identify the different background noises; and
assign a soft membership score to each of the background noises.

Item 20 is the device of item 13, wherein:
the memory is configured to store a psychoacoustical annoyance score of each of the plurality of annoying sounds; and
the processor is configured to:
assign a soft membership score to each of the background noises; and
attenuate the one or more annoying sounds in the output signal using the psychoacoustical annoyance scores and the soft membership scores.

Item 21 is the device of item 20, wherein the processor is configured to attenuate annoying sounds in the output signal that have a psychoacoustical annoyance score above an annoyance threshold pre-identified by the wearer.

Item 22 is the device of item 13, wherein the processor is configured to modify the annoying sound dictionary by one or both of canceling one or more annoying sounds represented in the dictionary and changing a psychoacoustical annoyance score of one or more annoying sounds represented in the dictionary.

Item 23 is the device of item 13, comprising an annoyance model implemented or coupled to the processor and configured to determine subbands in which attenuations are applied to for the one or more annoying sounds.

Item 24 is the device of item 23, wherein the annoyance model is configured to determine the subbands in response to receiving noise fingerprint identifications of the annoying sounds and annoying sound preferences of the wearer.

Although reference is made herein to the accompanying set of drawings that form part of this disclosure, one of at least ordinary skill in the art will appreciate that various adaptations and modifications of the embodiments described herein are within, or do not depart from, the scope of this disclosure. For example, aspects of the embodiments described herein may be combined in a variety of ways with each other. Therefore, it is to be understood that, within the scope of the appended claims, the claimed invention may be practiced other than as explicitly described herein.

All references and publications cited herein are expressly incorporated herein by reference in their entirety into this disclosure, except to the extent they may directly contradict this disclosure. Unless otherwise indicated, all numbers expressing feature sizes, amounts, and physical properties used in the specification and claims may be understood as being modified either by the term "exactly" or "about." Accordingly, unless indicated to the contrary, the numerical parameters set forth in the foregoing specification and attached claims are approximations that can vary depending upon the desired properties sought to be obtained by those skilled in the art utilizing the teachings disclosed herein or, for example, within typical ranges of experimental error.

The recitation of numerical ranges by endpoints includes all numbers subsumed within that range (e.g. 1 to 5 includes 1, 1.5, 2, 2.75, 3, 3.80, 4, and 5) and any range within that range. Herein, the terms "up to" or "no greater than" a number (e.g., up to 50) includes the number (e.g., 50), and the term "no less than" a number (e.g., no less than 5) includes the number (e.g., 5).

The terms "coupled" or "connected" refer to elements being attached to each other either directly (in direct contact with each other) or indirectly (having one or more elements between and attaching the two elements). Either term may be modified by "operatively" and "operably," which may be used interchangeably, to describe that the coupling or connection is configured to allow the components to interact to carry out at least some functionality (for example, a radio chip may be operably coupled to an antenna element to provide a radio frequency electric signal for wireless communication).

Terms related to orientation, such as "top," "bottom," "side," and "end," are used to describe relative positions of components and are not meant to limit the orientation of the embodiments contemplated. For example, an embodiment described as having a "top" and "bottom" also encompasses embodiments thereof rotated in various directions unless the content clearly dictates otherwise.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

As used in this specification and the appended claims, the singular forms "a," "an," and "the" encompass embodiments having plural referents, unless the content clearly dictates otherwise. As used in this specification and the appended claims, the term "or" is generally employed in its sense including "and/or" unless the content clearly dictates otherwise. As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like. The term "and/or" means one or all of the listed elements or a combination of at least two of the listed elements.

The phrases "at least one of," "comprises at least one of," and "one or more of" 60 followed by a list refers to any one of the items in the list and any combination of two or more items in the list.

What is claimed is:

1. A method implemented by an ear-worn electronic device comprising a housing configured to be worn at, in or on an ear of a wearer, the method comprising:
   storing, in a memory within the housing of the device, an annoying sound dictionary representative of a plurality of annoying sounds pre-identified by the wearer;
   storing a psychoacoustical annoyance score for each of the plurality of annoying sounds in the memory of the device;
   monitoring, using a microphone within or supported by the housing of the device, an acoustic environment of the wearer; identifying, by a processor within the housing of the device, different background noises present in the acoustic environment;
   assigning, by the processor, a soft membership score to each of the background noises;
   determining, by the processor, which of the background noises corresponds to one or more of the plurality of annoying sounds pre-identified by the wearer;
   and attenuating, by the processor using the psychoacoustical annoyance scores and the soft membership scores, the one or more annoying sounds in an output signal provided to a speaker or a receiver within or supported by the housing of the device.

2. The method of claim 1, wherein the processor attenuates only the one or more annoying sounds while passing all other sounds present in the acoustic environment.

3. The method of claim 1, wherein: the processor determines that a multiplicity of the background noises correspond to a multiplicity of the annoying sounds; and the processor attenuates the multiplicity of annoying sounds in the output signal.

4. The method of claim 1, wherein the processor attenuates each of the one or more annoying sounds in the output signal by a degree of attenuation pre-identified by the wearer.

5. The method of claim 1, wherein the processor uses an audiogram of the wearer to attenuate each of the one or more annoying sounds.

6. The method of claim 1, comprising adding an additional annoying sound identified by the wearer to the annoying sound dictionary.

7. The method of claim 1, wherein the processor: implements Block Sparse Non-negative Matrix Factorization to identify the different background noises.

8. The method of claim 1, wherein the processor attenuates annoying sounds in the output signal that have a psychoacoustical annoyance score above an annoyance threshold pre-identified by the wearer.

9. The method of claim 1, comprising:
   sorting the background noises present in the acoustic environment using the psychoacoustical annoyance scores of the background noises;
   presenting the sorted background noises to the wearer;

identifying, by the wearer, which of the sorted background noises are annoying sounds; and attenuating, by the processor, the annoying sounds identified by the wearer.

10. The method of claim 1, comprising determining subbands in which attenuations are applied to for the one or more annoying sounds.

11. The method of claim 10, wherein determining the subbands comprises determining the subbands by an annoyance model configured to receive noise fingerprint identifications of the annoying sounds and annoying sound preferences of the wearer.

12. An ear-worn electronic device configured to be worn by a wearer, comprising:
   a housing configured to be supported by, at, in or on an ear of the wearer and to contain or support:
   a processor;
   a memory coupled to the processor, the memory configured to store an annoying sound dictionary representative of a plurality of annoying sounds pre-identified by the wearer and store a psychoacoustical annoyance score of each of the plurality of annoying sounds;
   a microphone coupled to the processor and configured to monitor an acoustic environment of the wearer; and
   a speaker or a receiver coupled to the processor;
   wherein the processor is configured to identify different background noises present in the acoustic environment, assign a soft membership score to each of the background noises, determine which of the background noises correspond to one or more of the plurality of annoying sounds, and attenuate the one or more annoying sounds in an output signal provided to the speaker or receiver using the psychoacoustical annoyance scores and the soft membership scores.

13. The device of claim 12, wherein the processor is configured to attenuate only the one or more annoying sounds while passing all other sounds in the acoustic environment.

14. The device of claim 12, wherein the processor is configured to:
   determine that a multiplicity of the background noises correspond to a multiplicity of the annoying sounds; and attenuate the multiplicity of annoying sounds in the output signal.

15. The device of claim 12, wherein the processor attenuates each of the one or more annoying sounds in the output signal by a degree of attenuation pre-identified by the wearer.

16. The device of claim 12, wherein the processor is configured to attenuate each of the one or more annoying sounds using an audiogram of the wearer.

17. The device of claim 12, wherein the processor is configured to add an additional annoying sound identified by the wearer to the annoying sound dictionary.

18. The device of claim 12, wherein the processor is configured to:
   implement Block Sparse Non-negative Matrix Factorization to identify the different background.

19. The device of claim 12, wherein the processor is configured to attenuate annoying sounds in the output signal that have a psychoacoustical annoyance score above an annoyance threshold pre-identified by the wearer.

20. The device of claim 12, wherein the processor is configured to modify the annoying sound dictionary by one or both of canceling one or more annoying sounds represented in the dictionary and changing a psychoacoustical annoyance score of one or more annoying sounds represented in the dictionary.

21. The device of claim 12, comprising an annoyance model implemented by or coupled to the processor and configured to determine subbands in which attenuations are applied to for the one or more annoying sounds.

22. The device of claim 21, wherein the annoyance model is configured to determine the subbands in response to receiving noise fingerprint identifications of the annoying sounds and annoying sound preferences of the wearer.

* * * * *